Figure 9:
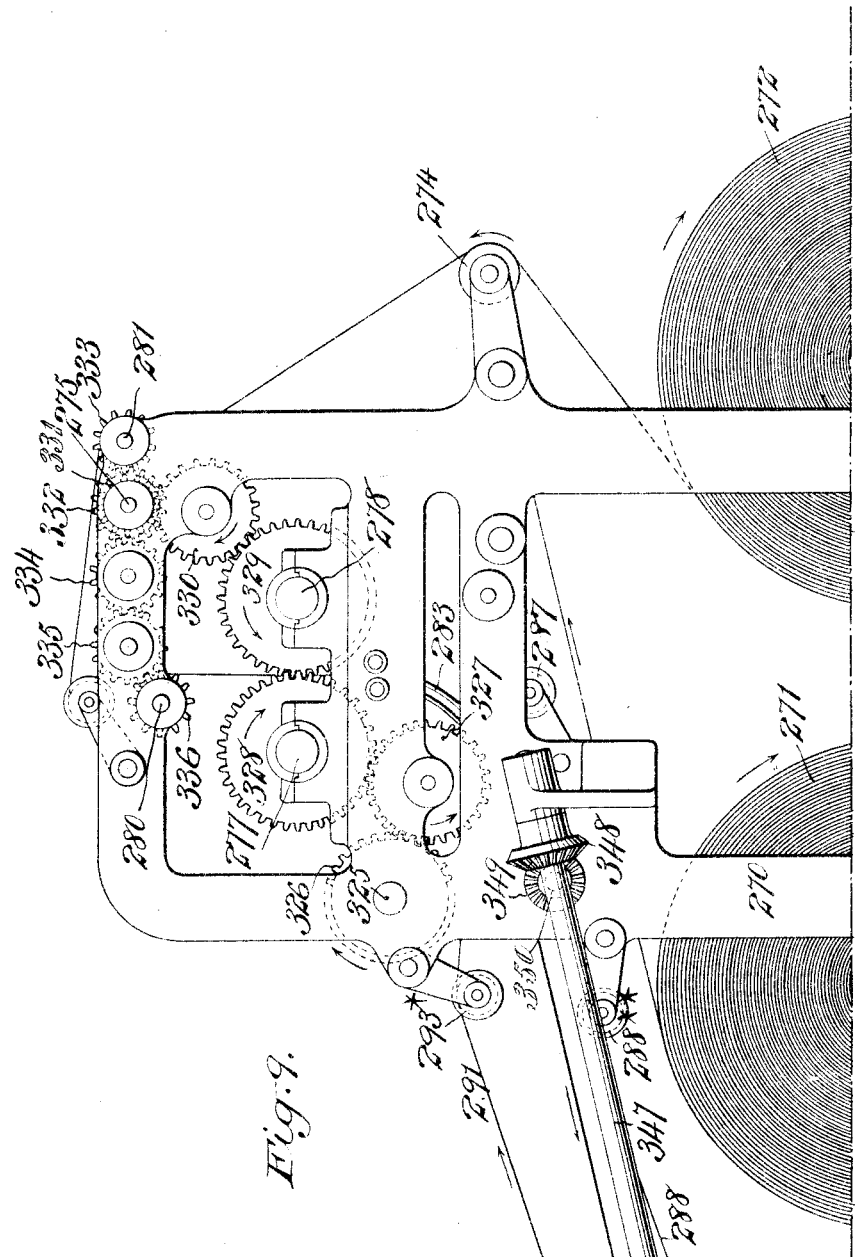

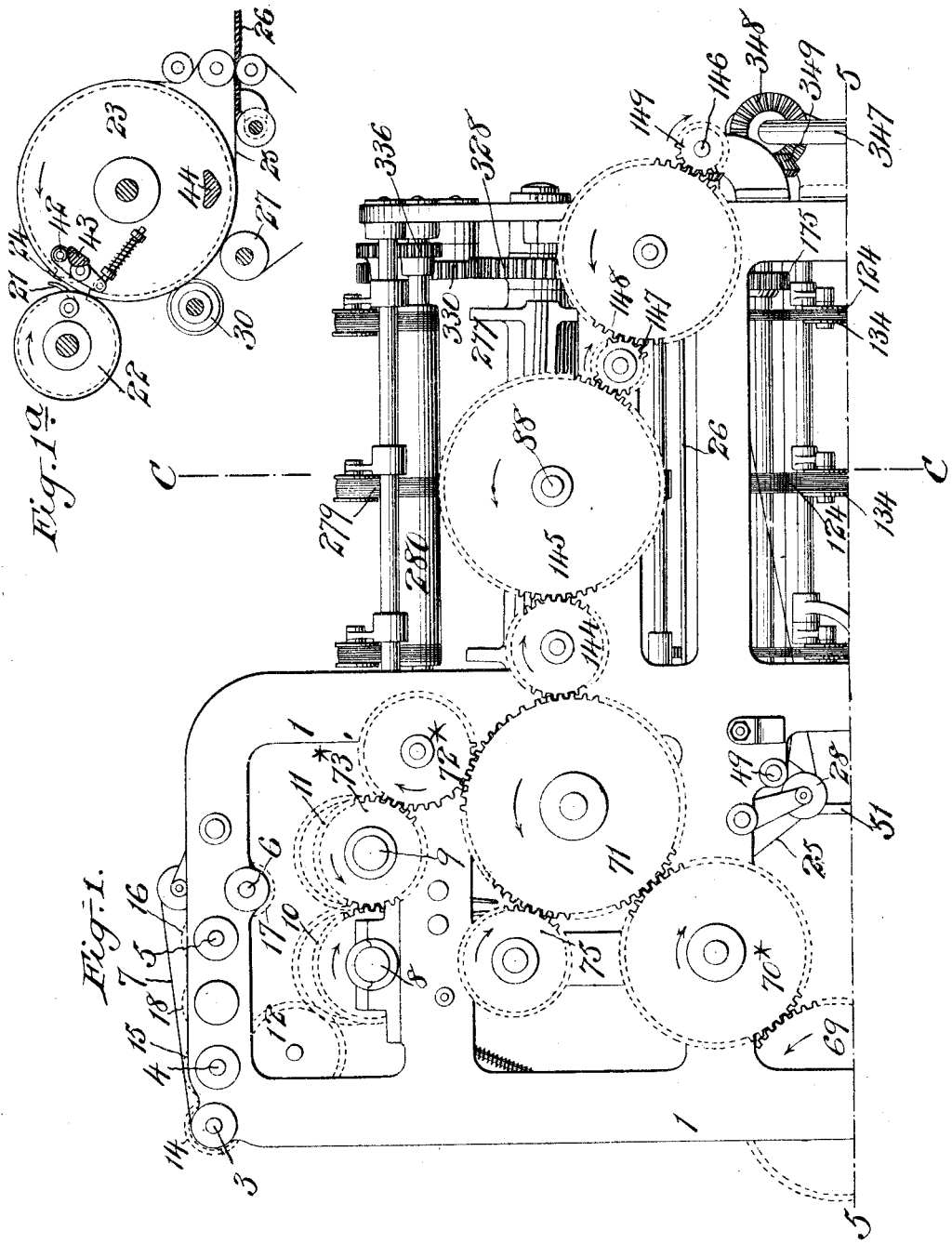

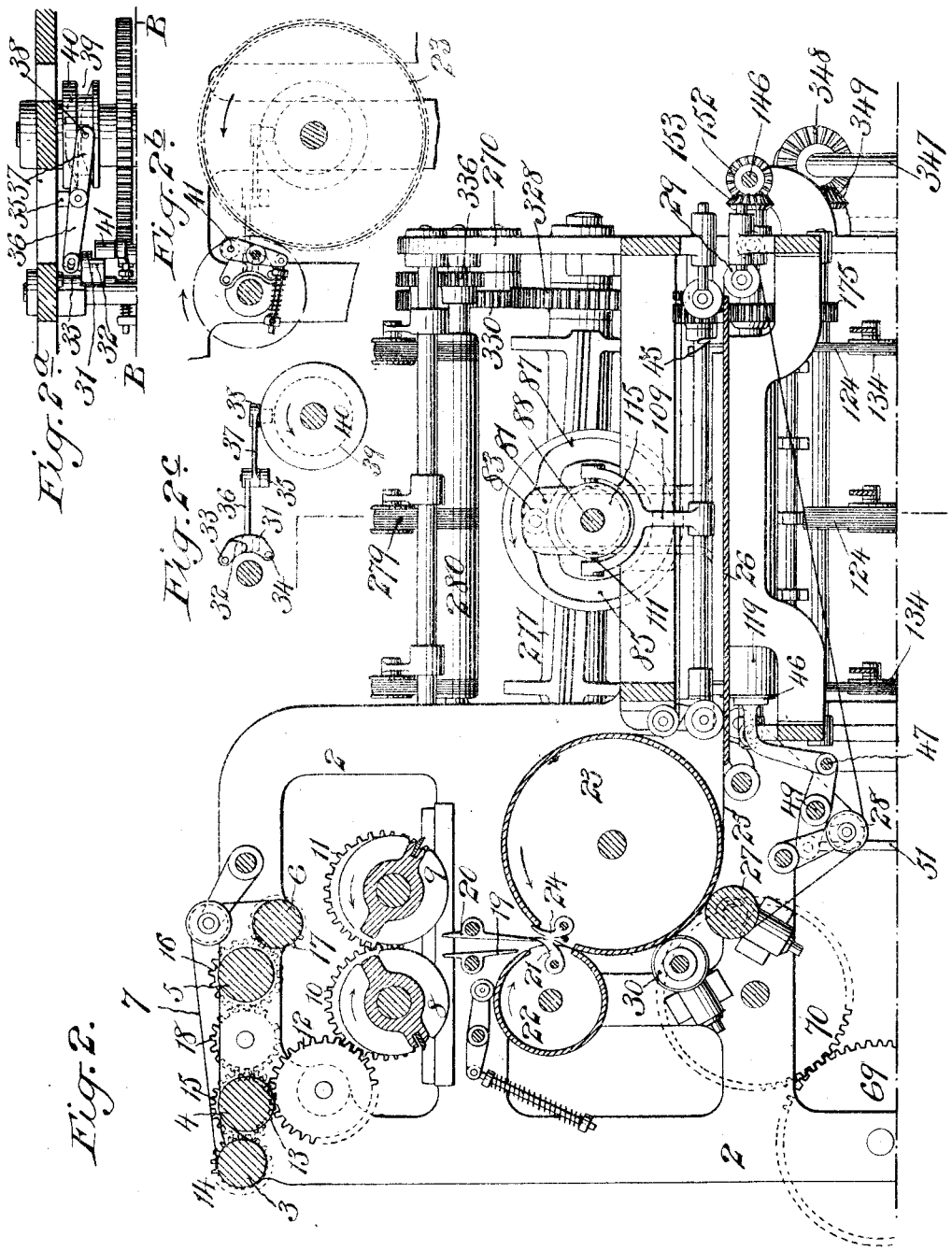

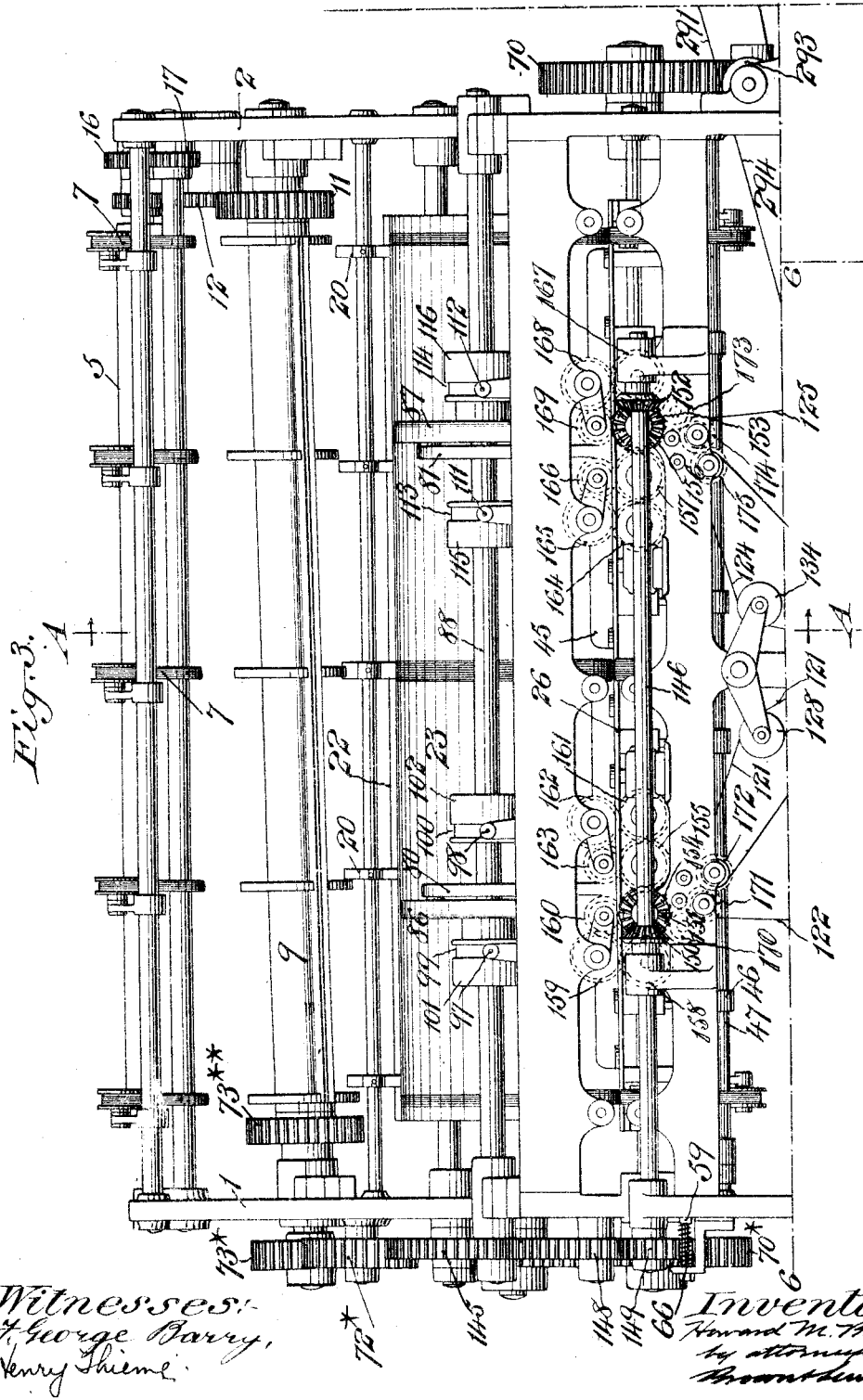

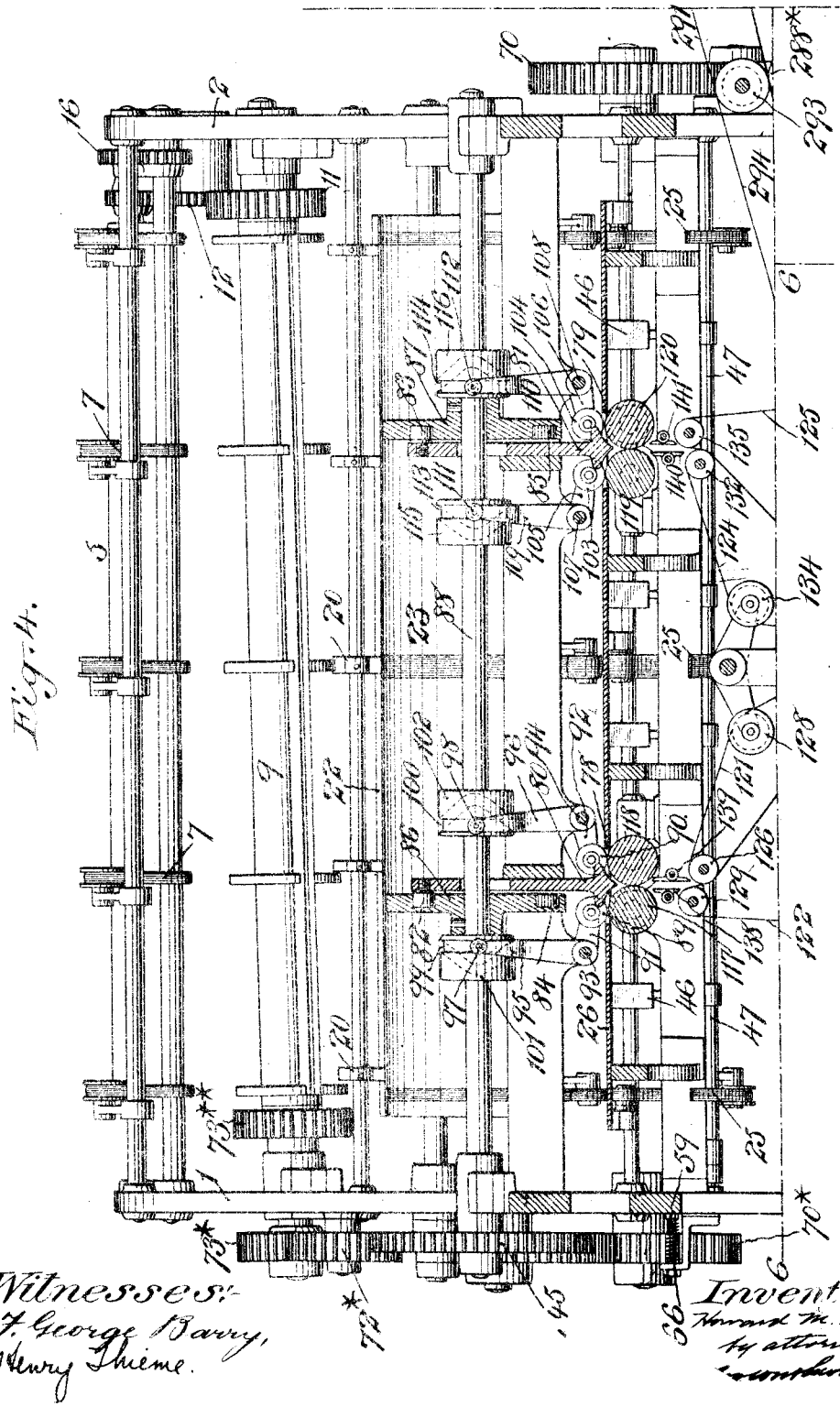

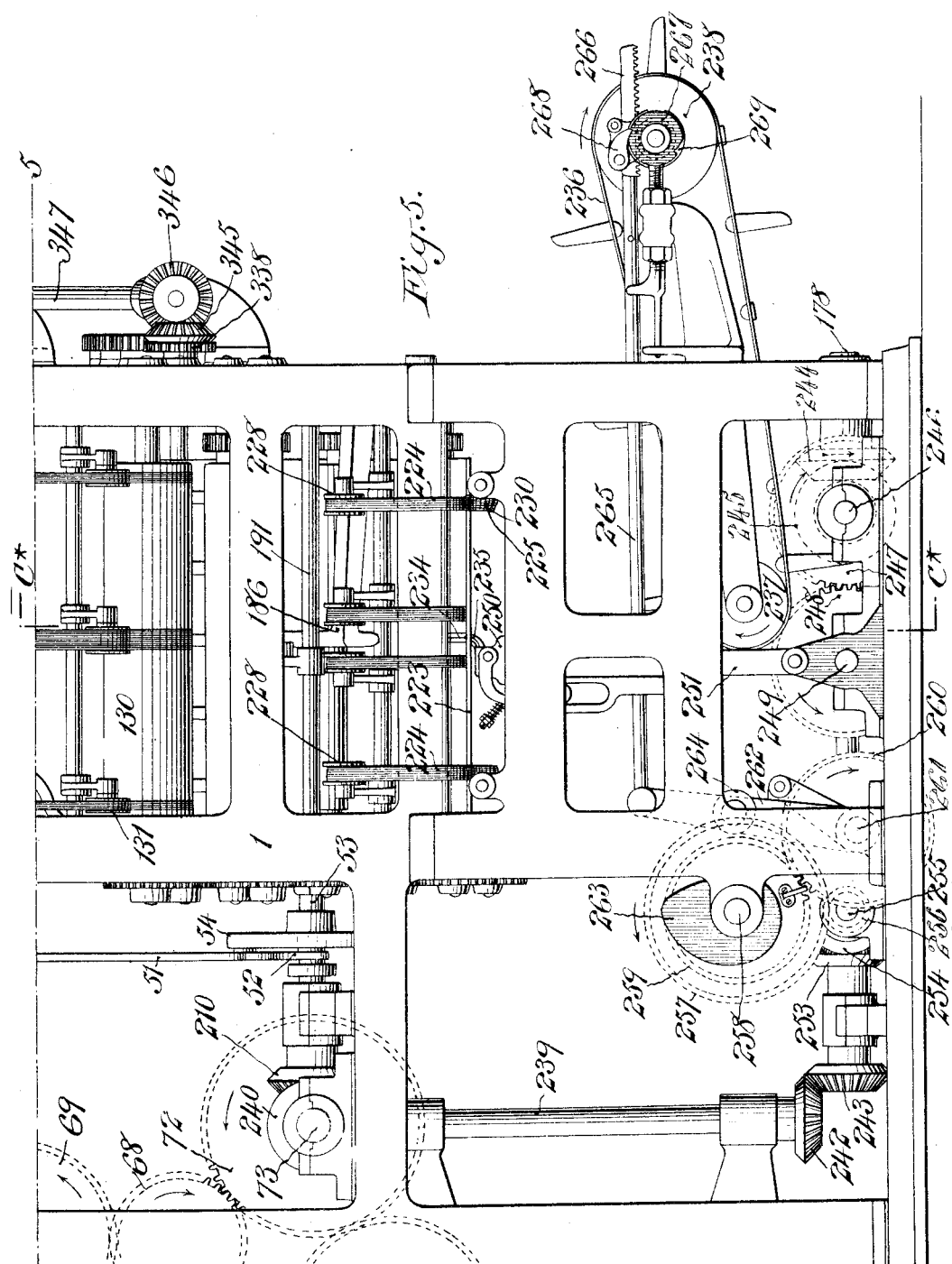

H. M. BARBER.
CUTTING AND FOLDING MACHINE.
APPLICATION FILED JUNE 25, 1906.
1,068,035.
Patented July 22, 1913.
15 SHEETS—SHEET 6.
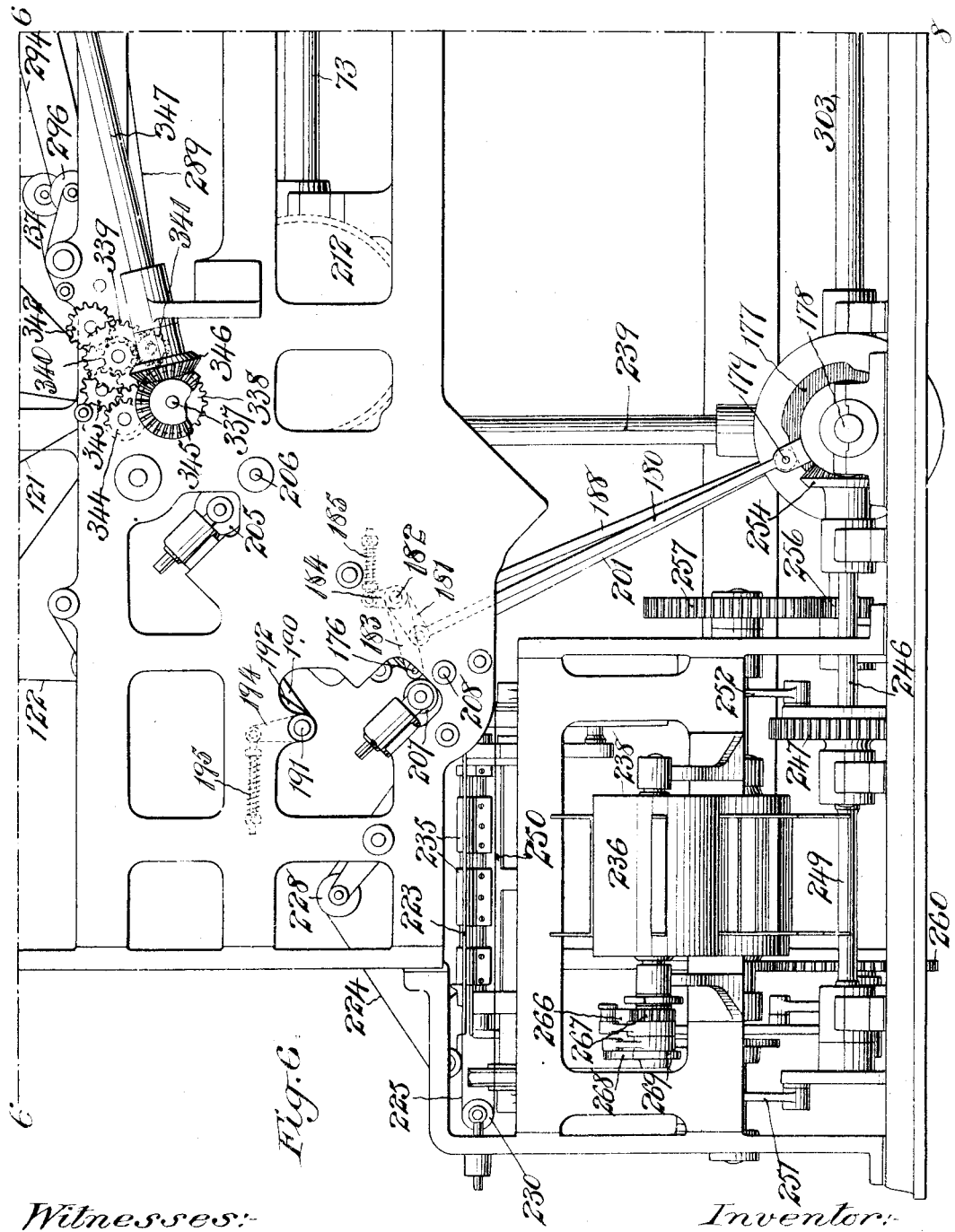

H. M. BARBER.
CUTTING AND FOLDING MACHINE.
APPLICATION FILED JUNE 25, 1906.
1,068,035.
Patented July 22, 1913.
15 SHEETS—SHEET 7.
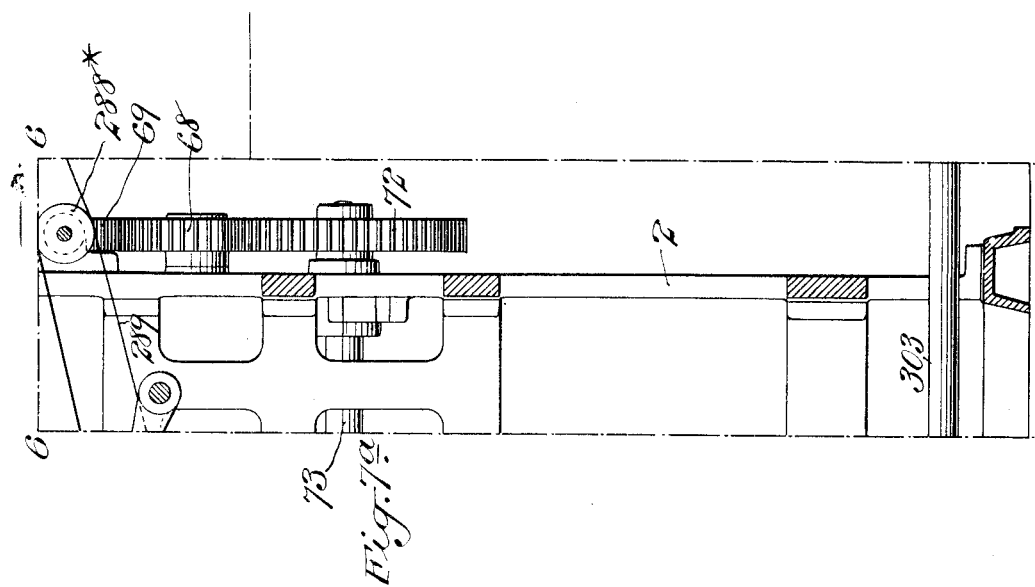
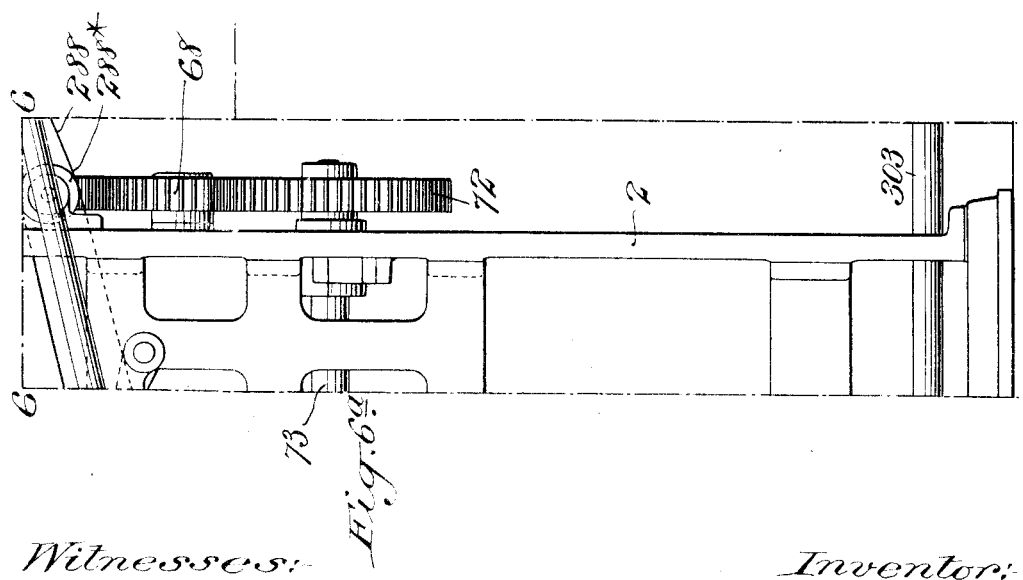

H. M. BARBER.
CUTTING AND FOLDING MACHINE.
APPLICATION FILED JUNE 25, 1906.
1,068,035.
Patented July 22, 1913.
15 SHEETS—SHEET 8.
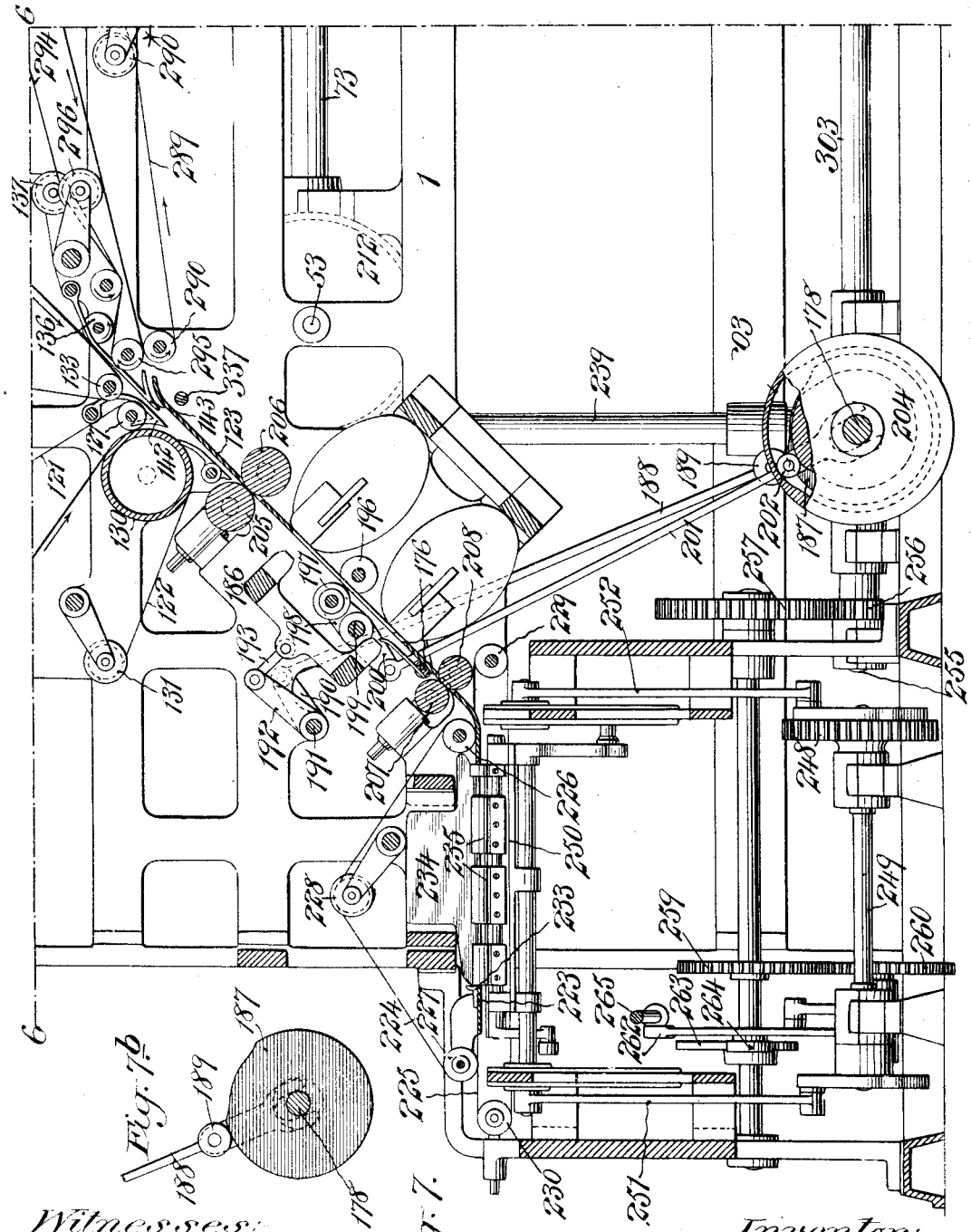

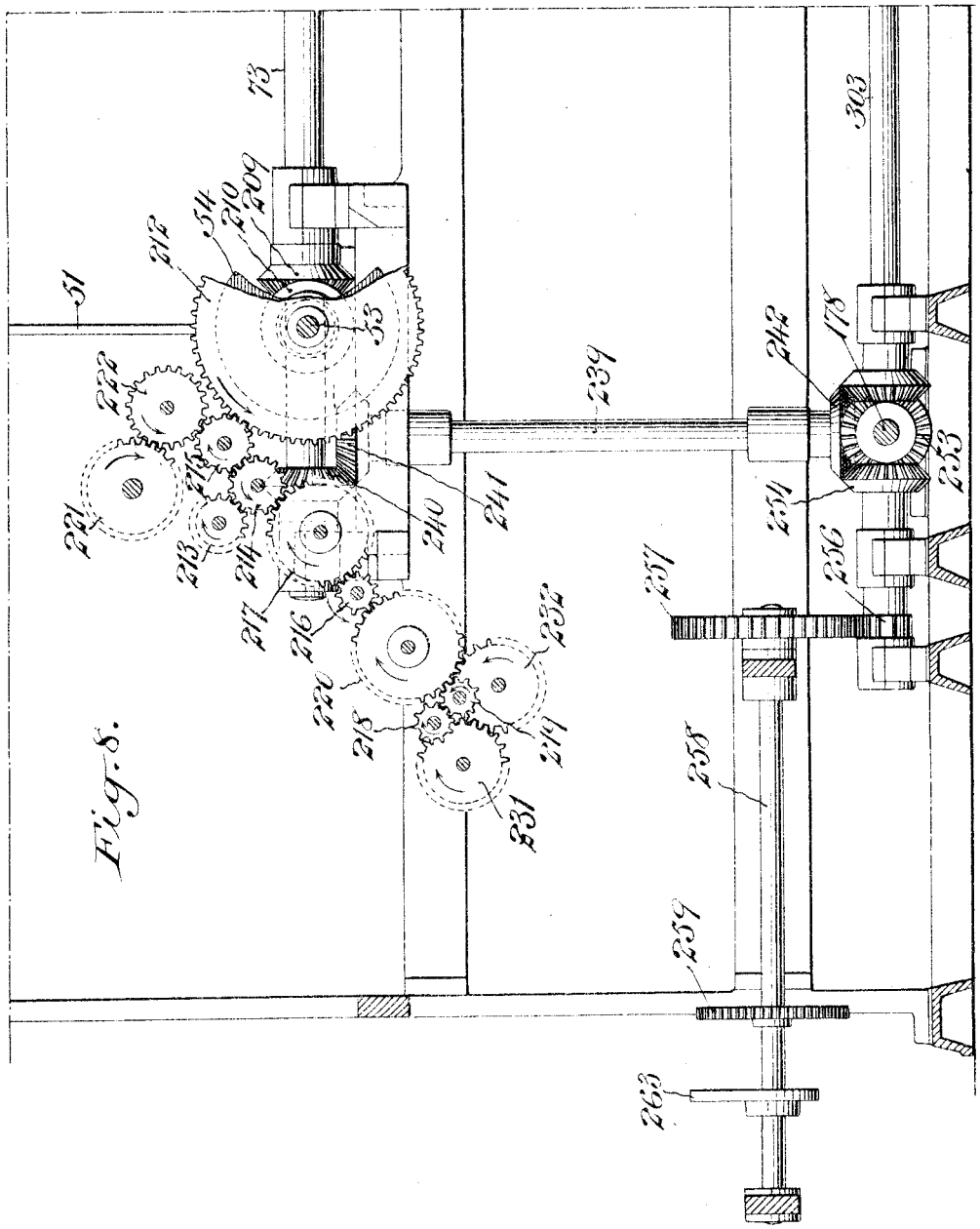

H. M. BARBER.
CUTTING AND FOLDING MACHINE.
APPLICATION FILED JUNE 25, 1906.

1,068,035.

Patented July 22, 1913.
15 SHEETS—SHEET 10.

Witnesses:
J. George Barry,
Henry Thieme.

Inventor:
Howard M. Barber
by attorneys

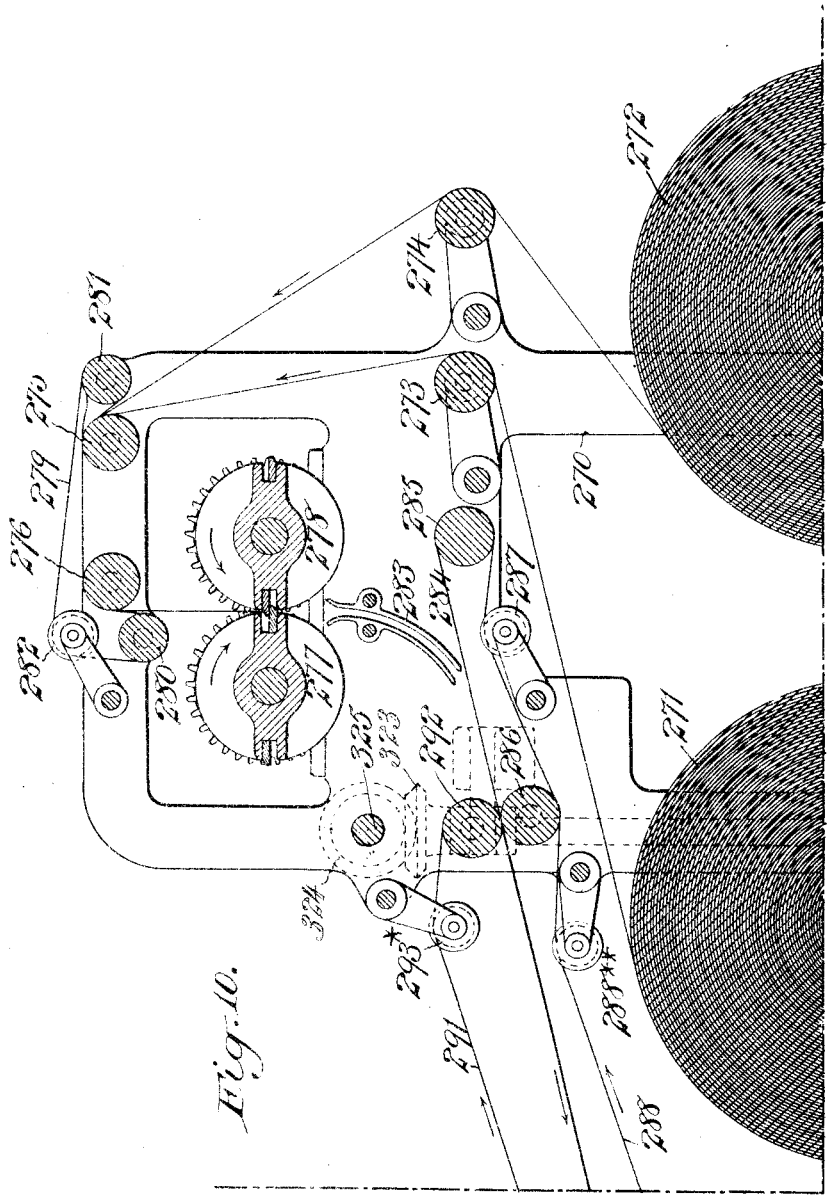

H. M. BARBER.
CUTTING AND FOLDING MACHINE.
APPLICATION FILED JUNE 25, 1906.
1,068,035.
Patented July 22, 1913.
15 SHEETS—SHEET 12.
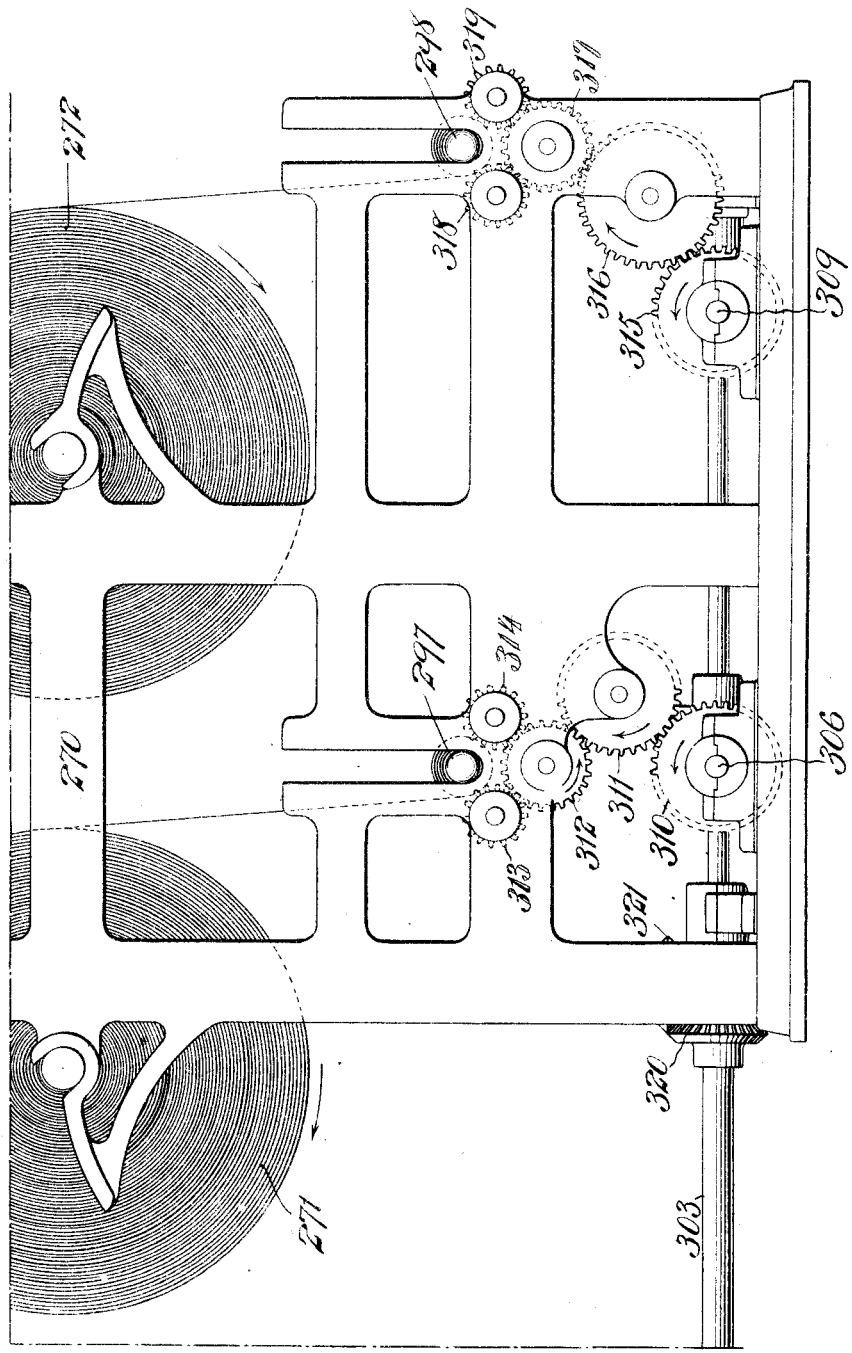

H. M. BARBER.
CUTTING AND FOLDING MACHINE.
APPLICATION FILED JUNE 25, 1906.
1,068,035.
Patented July 22, 1913.
15 SHEETS—SHEET 13.
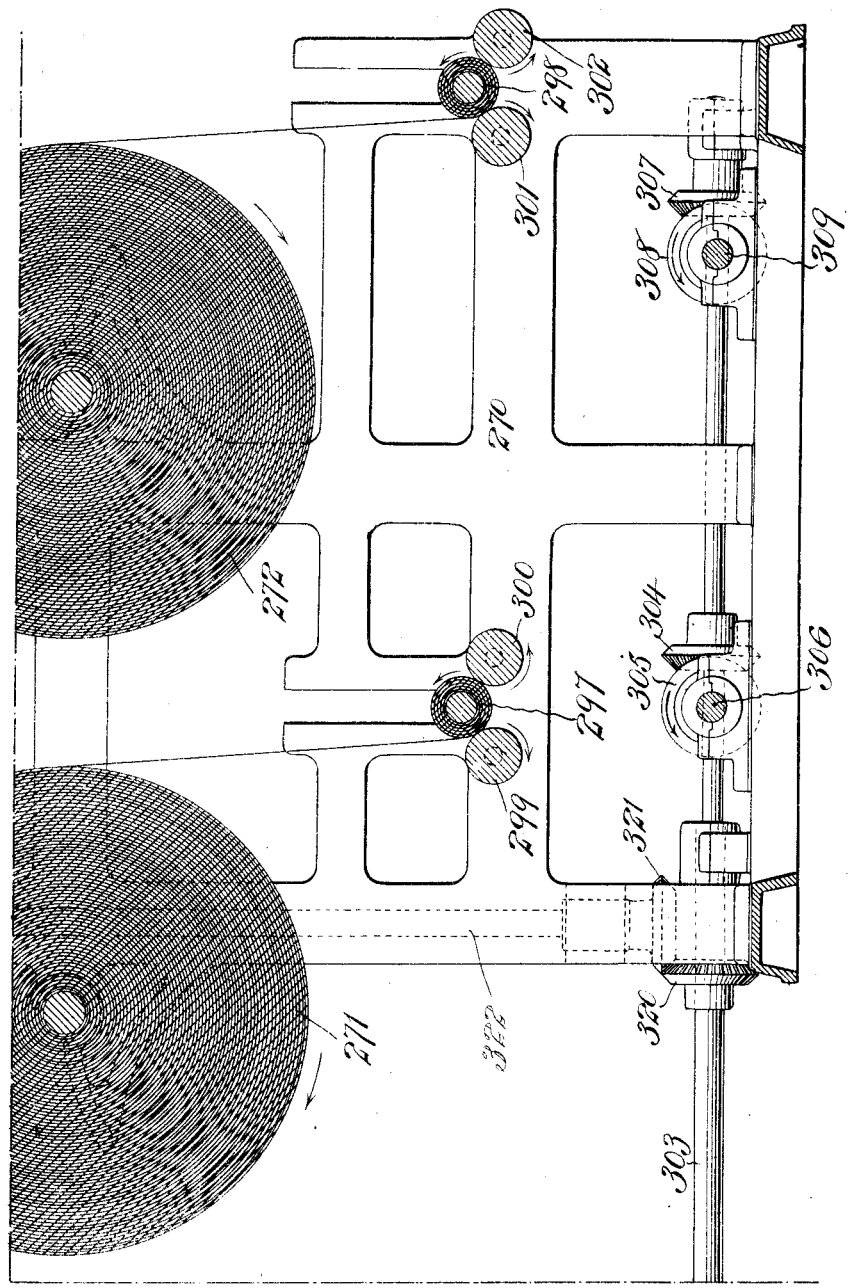

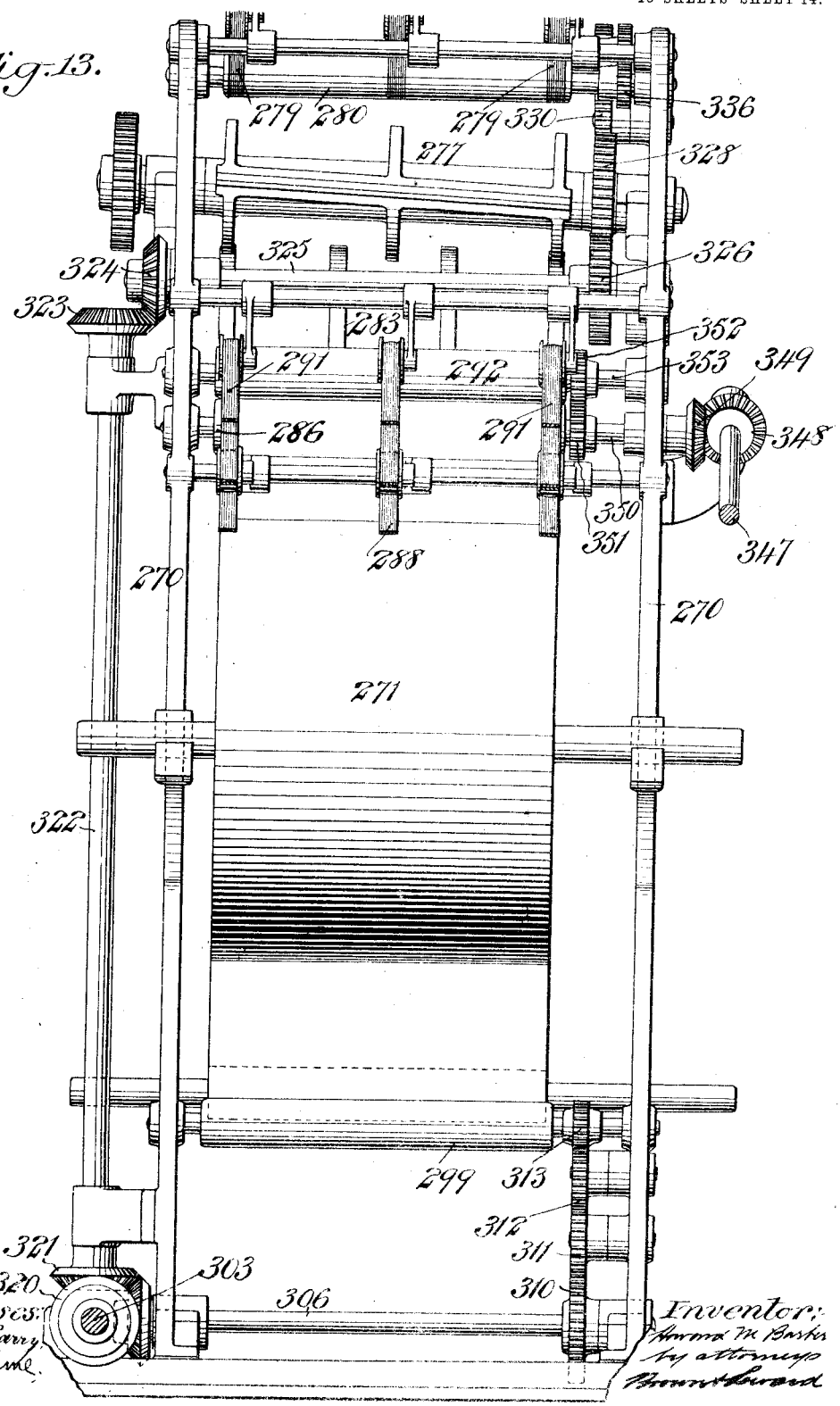

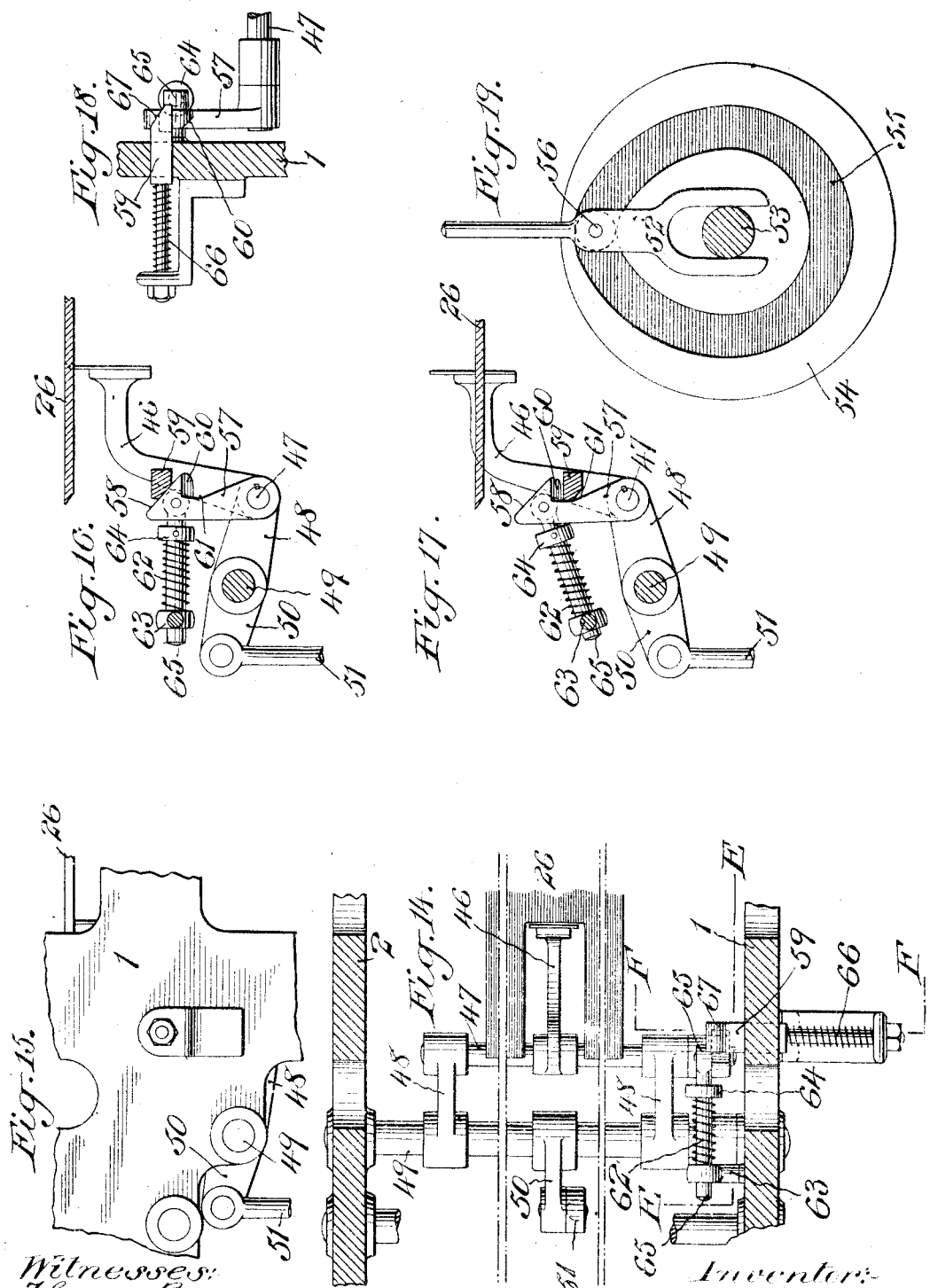

UNITED STATES PATENT OFFICE.

HOWARD M. BARBER, OF STONINGTON, CONNECTICUT, ASSIGNOR TO C. B. COTTRELL & SONS COMPANY, OF NEW YORK, N. Y., A CORPORATION OF NEW YORK.

CUTTING AND FOLDING MACHINE.

1,068,035.      Specification of Letters Patent.      Patented July 22, 1913.

Application filed June 25, 1906. Serial No. 323,259.

*To all whom it may concern:*

Be it known that I, HOWARD M. BARBER, a citizen of the United States, and resident of Stonington, in the county of New London and State of Connecticut, have invented a new and useful Improvement in Cutting and Folding Machines, of which the following is a specification.

In the production of a magazine or periodical from a press it has frequently been impossible to obtain the proper combination of sheets from the press alone to provide for the number of pages required in the said magazine or periodical.

The object of this invention is to provide separate sources of web sheet supply placed adjacent to the cutting, collecting and folding machine and provide automatic sheet cutting and feeding mechanism for said separate sources of extra web sheet supply whereby extra sheets may be fed at the proper time into position to be assembled with the sheets from the press, the assembling of the extra sheet or sheets with the sheets from the press being accomplished before the sheets are stitched and given their final fold.

It is intended that the sheet feeding mechanism for the separate web sheet supply shall be so timed with respect to the mechanism for feeding the sheets from the press that the sheets from the separate sources of web sheet supply may be used either as insert sheets or as cover sheets as may be desired. In the present case two separate sources of extra web sheet supply are shown for the purpose of illustrating the operation of the invention.

In the accompanying drawings, Figure 1 is a view in side elevation of a portion of the cutting, collecting and folding machine indicating the geared connections between the several parts; Fig. 1ª is a detail section taken inside the frame, showing the collecting and transfer cylinders, their adjacent parts and the cams for operating the grippers on the transfer cylinder; Fig. 2 is a vertical section through the portion of the machine shown in Fig. 1, taken in the plane of the line A—A of Fig. 3; Fig. 2ª is a detail section showing in top plan the mechanism for controlling the operation of the collecting cylinder; Fig. 2ᵇ is a detail sectional view taken in the plane of the line B—B of Fig. 2ª with the collecting and transfer cylinders shown in broken lines and the transfer cylinder gear shown in dotted lines; Fig. 2ᶜ is a detail side view of part of the mechanism for controlling the operation of the collecting cylinder; Fig. 3 is a front view of the portion of the machine shown in Fig. 1; Fig. 4 is a vertical section taken in the plane of the line C—C of Fig. 1; Fig. 5 is an extension of the view shown in Fig. 1, from the line 5—5; Fig. 6 is an extension of the view shown in Fig. 3 from the line 6—6; Fig. 6ª is an extension of the view shown in Fig. 6; Fig. 7 is a vertical section through the part shown in Fig. 6, taken in the plane of the line C*—C* of Fig. 5, which forms an extension of the line C—C of Fig. 1; Fig. 7ª is an extension of the view shown in Fig. 7; Fig. 7ᵇ is a detail view of the anvil cam which controls the operation of the stapling mechanism; Fig. 8 is a view of the principal portion of the driving mechanism of the machine, the portion of the machine shown corresponding with that shown in Fig. 7; Fig. 9 is a view in side elevation of the upper portion of the sheet cutting and feeding mechanism for the separate sources of web sheet supply; Fig. 10 is a vertical section of the same; Fig. 11 is a view in side elevation of the lower portion of said web sheet cutting and feeding mechanism; Fig. 12 is a vertical section of the same; Fig. 13 is a view in end elevation of the cutting and feeding mechanism for the separate sources of web sheet supply; Fig. 14 is a sectional view showing one of the joggers and its operating mechanism in top plan; Fig. 15 is a side view of the same; Fig. 16 is a vertical section taken in the plane of the line E—E of Fig. 14 showing the jogger in its lowered position; Fig. 17 is a similar view showing the jogger in its raised position; Fig. 18 is a detail section taken in the plane of the line F—F of Fig. 14, and Fig. 19 is a face view of the cam for operating the joggers.

The cutting, collecting and folding machine which is illustrated in the accompanying drawings is one which is adapted for use in connection with a perfecting printing press of the rotary type. The side frames of the machine are denoted by 1 and 2, in the top of which side frames there are mounted in suitable bearings web feeding rollers 3, 4, 5, 6, around which are led the web tapes 7. A pair of rotary smooth-edged cutters 8, 9, are mounted in the side frames 1 and 2 in position to receive the web as it is fed from the feeding rollers 5, 6. The speed of the rotary cutters is timed with respect to the speed of the web feeding rollers as follows. Gears 10, 11 of the rotary cutters 8, 9, mesh with each other and the gear 10 meshes with a gear 12 which in turn meshes with a gear 13 on the feeding roller 4. Gears 14, 15 connect the rollers 3, 4 and gears 16, 17, connect the rollers 5, 6. An intermediate idler gear 18 connects the gear 15 with the gear 16.

Sheet guides 19, 20 are mounted in the side frames 1 and 2 in position to direct the sheets from the rotary cutters 8, 9 into position to be engaged by a set of grippers 21 carried by a transfer cylinder 22 also mounted in the side frames 1 and 2. A delivery cylinder 23 is mounted in the side frames 1 and 2 and is provided with a set of grippers 24 arranged to successively receive the advance edges of a group of two sheets and deposit the same on to tapes 25 which are arranged to carry the group of two sheets to the sheet receiving table 26. These tapes 25 pass around rollers 27, 28, 29, suitably mounted in the side frames 1 and 2. A plurality of slitters 30 are mounted in the side frames 1 and 2 in position to slit the groups of sheets while on the delivery cylinder. In the present instance I have shown three of these slitters so that each group of two sheets is divided into four groups as they are fed on to the table 26.

Mechanism is provided for controlling the movement of the grippers 21 on the transfer cylinder 22 so that the said grippers may have a short opening to receive the first sheet from the cutters and a long opening for receiving the advance edge of the next succeeding sheet from the cutters and transfer the two sheets to the grippers 24 of the delivery cylinder 23. This mechanism is constructed as follows. A cam provided with a long surface 31 and a short surface 32 has a laterally sliding movement on studs 33, 34, projecting from the side frame 2, which cam is moved by a two-armed rock lever mounted on a lug 35 of the frame 2, one arm 36 of which rock lever is engaged with the laterally movable cam 31, 32, and the other arm 37 of which lever is provided with a stud 38 which is fitted to travel in an irregular groove 39 of a rotary cam 40 fixed to the shaft of the delivery cylinder 23. The long surface 31 or the short surface 32 of the laterally movable cam may be brought into position to engage the truck roller 41 of the set of grippers 21 at the proper times so that during one revolution of the transfer cylinder 22, the truck roller 41 is caused to travel over the short surface 32 and during the next revolution the said roller is caused to travel over the long surface 31 of the said cam.

The truck roller 42 of the set of grippers 24 on the delivery cylinder 23 is caused to travel over the stationary cam 43 on the side frame 1 for causing the grippers to open to receive the advance edges of two sheets from the grippers 21 of the transfer cylinder 22. A second stationary cam 44 is carried by the side frame 1 in position to engage the truck roller 42 and cause the grippers 24 to open to deliver the collected group of two sheets on to the tapes 25 to be fed on to the sheet receiving table 26.

The four groups of two sheets may be brought into proper register on the sheet receiving table 26 before they are assembled, by the folding mechanism. A sheet stop 45 is located along the outer end of the sheet receiving table 26 in position to receive the outer edges of the four groups of two sheets. A plurality of joggers are arranged to be brought above the plane of the table in position to strike the inner edges of the four groups of sheets. These joggers are denoted by 46 and they are affixed to a cross shaft 47 which is mounted to rock in the outer ends of rock arms 48 affixed to a rockshaft 49 mounted in the side frames 1 and 2. These joggers 46 are moved above and below the plane of the table 26 by providing the rock shaft 49 with an arm 50 having a depending rod 51 provided at its lower end with a yoke 52 which embraces the central cross shaft 53 of the machine so as to guide the arm 51 in its vertical movements. A cam 54 is fixed to the rotary shaft 53, which cam is provided with a face groove 55 in which a stud roller 56 carried by the rod 51 is located. The shape of this groove 55 is such that the shaft 49 will be rocked to raise and lower the joggers 46 at the proper times.

An independent rocking movement is imparted to the joggers 46 by providing the arm 57 fixed to the cross shaft 47, with a cam surface 58 arranged to engage with a laterally sliding spring-actuated tripping arm 59 mounted in the side frame 1. The inner end of the cam surface 58 on the arm 57 is located adjacent to the vertical wall 60 of a recess 61. A spring 62 is arranged between a lug 63 on the side frame 1 and a shoulder 64 carried by a sliding pin 65 hinged to the arm 57, which spring tends to return the arm and thereby the joggers 46 to the limit of their forward movement.

The laterally sliding tripping arm 59 is provided with a spring 66 tending to hold the arm in the path of the jogger arm 57. The top of this tripping arm 59 is provided with a cam surface 67 which is arranged to coact with the wall 60 of the recess 61 in the arm 57, which wall is arranged at an angle so that as the arm 57 is lowered it will force the arm 59 inwardly out of its path. From the above description it will be seen that as the arm 57 is raised, the joggers 46 will be swung rearwardly until they are permitted to snap back by the passing of the cam surface 58 beyond the arm 59.

A train of spur gears 68, 69, 70, 70* connects the spur gear 71 on the delivery cylinder 23 with the main drive spur gear 72 fixed to the cross shaft 73 mounted in the side frames 1 and 2, which spur gear 72 may be driven from any suitable means from the press, not shown herein. This spur gear 71 meshes with a spur gear 72* which in turn meshes with a spur gear 73* fixed to the shaft of the rotary cutter 9 the spur gear 73** on said shaft of the rotary cutter 9, in turn meshing with a spur gear 74 affixed to the shaft of the rotary cutter 8. The spur gear 71 also meshes with a spur gear 75 affixed to the transfer cylinder 22.

The means shown for assembling the four groups of two sheets each together is constructed and arranged as follows: The sheet receiving table 26 has two openings 78, 79, therethrough, the opening 78 being located beneath the adjacent side edges of two groups of two sheets each at one side of the machine and the opening 79 being located beneath the side edges of the other two groups of two sheets each at the other side of the machine. Directly above these adjacent side edges are located vertically sliding V-shaped guides 80, 81, which are provided with studs 82, 83, arranged to travel in cam grooves 84, 85, in the faces of cams 86, 87, affixed to a rotary cross shaft 88 mounted in suitable bearings in the side frames 1 and 2. Adjacent to the V-shaped guide 80, on opposite sides of the same, are provided positively rotated feeding pulleys 89, 90 carried by the lower arms 91, 92, of rock levers pivoted at 93, 94, the upper arms 95, 96, of said levers having studs 97, 98, fitted to travel in peripheral cam grooves 99, 100 of cams 101, 102 affixed to rotate with the cross shaft 88. Similarly, positively driven feeding pulleys 103, 104, are mounted in the lower arms 105, 106 of rock levers pivoted at 107, 108, the upper arms 109, 110 of which are provided with studs 111, 112 arranged to travel in peripheral cam grooves 113, 114 in cams 115, 116 fixed to rotate with the cross shaft 88. Feeding rollers 117, 118 are located directly beneath the guide 80 below the table 26 and feeding rollers 119, 120 are located directly beneath the guide 81 below the table 26. The feeding rollers 117, 118, are arranged to receive between them the adjacent side edges of two groups of two sheets each at one side of the machine and feed them between sheet carrying tapes 121, 122, which tapes in turn feed the sheets on to a stitcher table 123.

The feeding rollers 119, 120 are similarly arranged to receive between them the adjacent side edges of the other two groups of two sheets each and feed the said sheets between sheet carrying tapes 124, 125, which tapes in turn feed the sheets on to the stitcher table 123 where the four groups of two sheets each are assembled together.

The sheet carrying tapes 121 pass around pulleys 126 beneath the feeding rollers 117, 118, pulleys 127 adjacent to the upper end of the stitcher table 123 and idler pulleys 128. The sheet carrying tapes 122 pass around pulleys 129 beneath the feeding rollers 117, 118, a roll 130 adjacent to the upper end of the stitcher table 123 and intermediate idler pulleys 131. The sheet carrying tapes 124 pass around pulleys 132 beneath the feeding rollers 119, 120, pulleys 133 adjacent to the upper end of the stitcher table 123 and intermediate idler pulleys 134. The sheet carrying tapes 125 pass around pulleys 135 beneath the feeding rollers 119, 120, pulleys 136 spaced a short distance above the upper end of the stitcher table 123 and around intermediate idler pulleys 137. Guides 138, 139 are arranged between the feeding rollers 117, 118 and the tape pulleys 126, 129. Guides 140, 141 are arranged between the feeding rollers 119, 120 and the tape pulleys 132, 135. Guides 142, 143 are arranged in position to direct the two groups of two sheets each from their carrying tapes on to the stitcher table 123.

The cross shaft 88 is driven from the delivery cylinder gear 71 through spur gears 144, 145. A cross shaft 146 is suitably mounted in the side frames, which cross shaft is driven from the spur gear 145 through spur gears 147, 148, 149. The cross shaft 146 is provided with a bevel gear connection 150, 151 with the shaft of the feeding roller 117 and a similar bevel gear driving connection 152, 153, with the feeding roller 120. The roller 117 has a spur gear driving connection 154, 155 with its other roller 118; and the roller 120 has a spur gear connection 156, 157 with its other roller 119. Rotary movement is imparted to the feeding pulley 89 from the roller 117 through a train of spur gears 158, 159, 160. Rotary movement is imparted to the feeding pulley 90 from the feeding roller 118 through a train of spur gears 161, 162, 163. Similarly the feeding pulleys 103, 104, are driven from the feeding rollers 119, 120 through trains of spur gears 164, 165, 166 and 167, 168, 169 respectively. The sheet carrying tape pulleys 126, 129 are driven from the feeding roller gear 154 through a train of spur gears 170, 171, 172. Similarly the sheet carrying tape pulleys 132, 135 are driven from the feeding roller gear 156 through a train of spur gears 173, 174, 175.

A sheet stop 176 is arranged near the lower end of the stitcher table 123, which sheet stop is arranged in position to be brought into engagement with the table for receiving the advance edges of the assembled sheets and to be moved away from the table for releasing the collected group of sheets at a predetermined time. The mechanism for operating this sheet stop comprises a cam 177 on a cam shaft 178, which cam 177 engages a stud 179 on a longitudinally movable connecting rod 180, the upper end of which is connected to one arm 181 of a rock lever pivoted at 182, another arm 183 of which lever carries the sheet stop 176. A third arm 184 of said rock lever is under the influence of a spring 185 tending to hold the sheet stop in engagement with the carrier table and the connecting rod 180 at the limit of its downward movement with its stud 179 in engagement with the periphery of the cam 177.

Any well known or approved stitching mechanism might be employed for stitching the assembled sheets together. In the present instance the stitcher anvil is denoted by 186, the movement of which anvil is controlled by a cam 187 on the cam shaft 178, through a longitudinally movable connecting rod 188 having a stud roller 189 bearing against the periphery of the cam 187, the upper end of which connecting rod is connected to one arm 190 of a rock lever pivoted at 191, another arm 192 of which is connected by a link 193 to the anvil 186. A third arm 194 of this rock lever is under the influence of a spring 195 tending to force the stitcher anvil toward the stitcher table and the connecting rod 188 at the limit of its downward movement with its stud roller 189 in engagement with the periphery of its cam 187.

Mechanism is provided for feeding the assembled group of sheets from the stitcher table after they have been stitched and after the sheet stop has been raised, which mechanism in the present instance comprises the following. Positively driven friction rollers 196 are located beneath the stitcher table 123, which rollers are arranged to coact with friction rollers 197 arranged above the stitcher table, the rollers 197 being arranged to be brought into and out of engagement with the upper surface of the assembled group of sheets by mounting these rollers in arms 198 of a lever pivoted at 199, another arm 200 of which lever is attached to the upper end of a longitudinally movable connecting rod 201, the lower end of which is provided with a stud roller 202 arranged to travel in the groove 203 of a box cam 204. An upper set of feeding rolls 205, 206 is arranged above and below the stitcher table 123 respectively, in position to receive the assembled group of sheets as they are fed on to the table. A lower set of feeding rolls 207, 208 are arranged above and below the stitcher table in position to feed the assembled group of sheets to the final folder after they have been stitched. The means for driving the upper and lower sets of feeding rolls and the intermediate set of feeding rolls is as follows. The shaft 73 has a bevel gear connection 209, 210 with a short cross shaft 53, which cross shaft is provided with a spur gear 212 which is connected to the intermeshing gears 213, 214 of the rolls 205, 206, through an intermediate gear 215. The gear 216 of the rollers 196 is driven from the gear 214 through an intermediate gear 217. The intermeshing gears 218, 219 of the lower set of feeding rolls 207, 208, are driven from the gear 216 through an intermediate gear 220.

The roll 130 around which the sheet carrying tapes 122 pass is driven from the spur gear 215 by providing the shaft of the roll 130 with a spur gear 221 which gear meshes with an intermediate gear 222 which in turn meshes with the gear 215.

After leaving the stitcher table, the assembled group of sheets are given their final fold and then delivered. In the present instance the stitcher table 123 is extended horizontally at its lower end to form the folding table 223. The sheet carrying tapes 224 are arranged to coact with the sheet carrying tapes 225 for carrying the assembled group of sheets into position on the folding table to be folded. The sheet carrying tapes 224 pass around pulleys 226, 227, 228. The sheet carrying tapes 225 pass around pulleys 229, 230. These tapes are driven from the pulleys 226 and 229 by the shafts of said pulleys with intermeshing gears 231, 232, the gear 232 intermeshing with the intermediate gear 220 hereinbefore referred to. A sheet stop 233 is arranged on the table 223 in position to engage the advance edges of the assembled group of sheets when the sheets are brought into position to be folded. The folding mechanism shown herein is substantially like that shown in United States Patent No. 736,031 dated August 11, 1903, entitled Machinery for folding paper or other fabrics and is arranged to deliver the folded group of sheets on to a pocket carrier of any well known and approved form, such, for instance, as that shown in the patent above referred to.

The folding blade is denoted by 234 and it is arranged to coact with spring grippers 235. The pocket carrier is denoted by 236 and it travels around the drums 237, 238 and is so arranged that the successive pockets in the carrier will be brought into position to receive the assembled group of sheets from the grippers 235 at predetermined intervals.

The principal parts of the mechanism for operating the folder are constructed and arranged as follows. A vertical shaft 239 is driven from the cross shaft 73 through a bevel gear connection 240, 241. The lower end of this shaft 239 has a bevel gear connection 242, 243, with the cross shaft 178. This cross shaft has a bevel gear connection 244, 245 with a short shaft 246, which shaft in turn has a spur gear connection 247, 248 with a crank shaft 249. This crank shaft 249 is connected to the vertically reciprocating gripper carriage 250 through connecting rods 251, 252.

The main parts of the drive for giving an intermittent movement to the pocket carrier are constructed and arranged as follows: The shaft 178 has a bevel gear connection 253, 254 with a shaft 255, which shaft has a spur gear connection 256, 257 with a longitudinal shaft 258, which shaft in turn has a spur gear connection 259, 260 with a shaft 261 which controls the timing of a rock arm 262 so that said rock arm will move the pocket carrier at a predetermined time through the influence of a peripheral cam 263 which is arranged to engage a truck roller 264 on said arm 262. This arm 262 has a rod 265 provided with a rack 266 in engagement with a pinion 267 arranged to be connected to the drum 258 through a pawl 268 and a two-toothed ratchet 269.

The mechanism for cutting sheets from separate sources of previously printed web sheet supply and for feeding the sheets to the stitcher table is constructed and arranged as follows: A framing 270 is located in proximity to the frame of the cutting and folding machine, which framing has mounted therein two printed web rolls 271, 272. The previously printed webs are led from the rolls 271, 272 around idler rolls 273, 274, over feeding rolls 275, 276 and from thence to rotary cutters 277, 278 of any well known and approved form. Web tapes 279 engage the webs from the web rolls 271, 272 as they pass over the feeding rolls 275, 276, which tapes also pass around tape rolls 280, 281 and idler pulleys 282. A sheet guide 283 directs the sheets as they are cut from the web by the rotary cutters on to sheet carrying tapes 284 which pass around rolls 285, 286 and over idler pulleys 287. The sheet carrying tapes 288 form an extension of the tapes 284 and pass around the rolls 286, and pulleys 288* and over an intermediate idler pulley 288**. The sheet carrying tapes 289 which form an extension of the tapes 288 pass around the pulleys 288*, also around pulleys 290 located adjacent to the upper end of the stitcher table 123, and under intermediate idler pulleys 290*. The sheet carrying tapes 291 are arranged to coact with the sheet carrying tapes 288 and pass around a roll 292, pulleys 293 and over an idler pulley 293*. The sheet carrying tapes 294 form an extension of the tapes 291 and are arranged to coact with the tapes 289, the tapes 294 passing around the pulleys 293 and also around pulleys 295 located adjacent to the upper end of the stitcher table 123. These tapes 294 also pass over idler pulleys 296. Offset rolls 297, 298 are arranged to wind the offset web off the rolls 271, 272 as the printed web is unwound therefrom. These rolls 297, 298 rest upon pairs of friction driving rolls 299, 300 and 301, 302 respectively.

The means which I have shown for driving the several parts of the mechanism for cutting sheets from the separate sources of web roll supply and feeding them to the cutting and folding machine are as follows. A horizontal shaft 303 is driven from the shaft 178 of the cutting and folding machine, the shaft 303 having a bevel gear drive 304, 305 with a horizontal shaft 306 and a bevel gear drive 307, 308 with a horizontal shaft 309. The shaft 306 has a spur gear driving connection 310, 311, 312 with the gears 313, 314 of the rolls 299, 300 which wind the offset roll 297. Similarly, the shaft 309 has a spur gear driving connection 315, 316, 317 with the gears 318, 319 of the rolls 301, 302 which wind the offset roll 298. The cutting and feeding mechanism is driven from this shaft 303 as follows. The shaft 303 has a bevel gear driving connection 320, 321 with the lower end of a vertical shaft 322, the upper end of which shaft has a bevel gear driving connection 323, 324, with a horizontal shaft 325, which shaft has a spur gear driving connection 326, 327, with a spur gear 328 on one of the rotary cutter shafts which in turn meshes with a spur gear 329 on the other rotary cutter shaft. The spur gear 329 has a spur gear driving connection 330 with a spur gear 331 on the roll 275, which roll has a spur gear 332 which meshes with a spur gear 333 on the web roll 281 and also is connected to the feeding roll 276 through gears 334, 335. The gear 335 meshes with a gear 336 on the web roll 280.

The shaft 337 is provided with a spur gear 338 which meshes with a spur gear 339 on the shaft of the pulleys 295. This shaft has a spur gear 340 which meshes with spur gears 341, 342, 343 on the shafts of the tape pulleys 290, 136, 133 respectively. The gear 343 meshes with a spur gear 344 on the shaft of the tape pulleys 127. This shaft 337 is further provided with a bevel gear connection 345, 346 with one end of a shaft 347, the other end of which shaft has a bevel gear driving connection 348, 349 with the shaft 350 of the web roll 286. This shaft 350 has a spur gear 351 which meshes with a spur gear 352 on the shaft 353 of the web roll 292.

In operation the web as it comes from the perfecting press is fed along by the tapes 7 between the feeding rollers 3, 4 and the feeding rollers 5, 6. From thence the web is fed down between the rotary cutters 8, 9 until the advance edge of the web is engaged by the grippers 21 of the transfer cylinder 22. The transfer cylinder is so timed that it will collect a group of two sheets thereon and then transfer the same to the grippers 24 on the delivery cylinder 23. This delivery cylinder 23 is arranged to deposit the group of two sheets on to the tapes 25, which tapes are arranged to carry the group of two sheets on to the sheet receiving table 26. The group of two sheets is slit into four groups of two sheets each by the slitters 30 as the sheets are being carried from the transfer cylinder 22 to the tapes 25. In the present instance three of these slitters 30 divide the group of sheets into four groups of two sheets each. The four groups of two sheets each may be brought into proper register on the sheet receiving table 26 by the joggers hereinbefore described which are arranged to be brought below the plane of the table 26 as the groups of sheets are carried on to the table by the tapes 25 and are arranged to be brought above the plane of the table in position to direct the inner edges of the four groups of two sheets each when the outer edges of the same are in engagement with the stop 45. As soon as the four groups of two sheets each have been brought into proper register on the sheet receiving table, they may be assembled as follows. Both sets of feeding rollers 117, 118 and 119, 120 and their feeding pulleys 89, 90 and 103, 104 rotate continuously but are only brought into contact with each other at such times as it is necessary to start and feed the sheets down between the feeding rollers on to the two sets of sheet carrying tapes 121, 122 and 124, 125. The adjacent edges of two groups of two sheets each, at one side of the machine are deflected and caused to pass down between the rollers 117, 118 by the downward movement of the V-shaped guide 80 at the proper time. Similarly, the V-shaped guide 81 is moved downwardly for deflecting the adjacent edges of the other two groups of two sheets each and causing the sheets to pass down between the rollers 119, 120. These two groups of two sheets each are brought together on the stitcher table 123, the advance edges of all of the sheets being brought into proper register by engaging the sheet stop 176.

It is frequently the case that the magazine or periodical to be produced contains more pages or such a number of pages that it is impossible to obtain the proper combination of sheets from the press alone. The proper number of sheets can be produced by feeding and combining with the four groups of two sheets each on the stitcher table, sheets cut from independent sources of web sheet supply as follows: The previously printed webs are rewound on suitable cores as they come from the presses upon which they are printed, together with continuous blotters or offset sheets, thus preventing smut and offset. The previously printed webs from the so wound rolls 271, 272 are brought together at the feeding roll 275 and are fed by the rolls 275, 276 and the tapes 279, to the rotary cutters 277, 278, which cutters are arranged to cut the sheets from the webs and deliver them to the guide 283. As the webs are unwound from the rolls, the offset sheets are wound on to the rolls 297, 298. This guide 283 deposits the two sheets from the previously printed webs on to the tapes 284. From thence the collected group of two sheets are fed between the tapes 288, 291 and from thence between the tapes 289, 294. These last named tapes will feed the group of two previously printed sheets cut from the webs on to the stitcher table 123 in position to be combined with the assembled groups of sheets from the press. The feeding of these sheets from the previously printed webs may be timed with respect to the arrival of the assembled groups of sheets from the press so as to be used as inserts or as covers as may be desired. It may also be seen that if so desired, only one sheet at a time may be fed on to the stitcher table from one source of previously printed web sheet supply.

After the sheets which have been cut from the previously printed webs are assembled with the groups of sheets from the press, they are stitched together. The sheet stop 176 is then raised and the assembled group is fed into proper position on to the final folding table 223. The group is then given its final fold by the grippers 235 and the stationary blade 234, and the grippers are then operated to transfer the product to the pocket carrier.

It will be seen that in the operation above described the sheets are severed from the web, collected and slit into a plurality of groups and then assembled into a single group without employing formers or turning-bars. The elimination of the formers or turning-bars enables the machine to handle and fold a magazine class of work which cannot be satisfactorily done where formers or turning bars are employed.

It is to be understood that the several mechanisms hereinabove described are arranged and timed to coact with one another so as to produce the combination and assemblage of the desired number of sheets.

One very important feature of this auxiliary sheet feeding arrangement is that it makes it not only possible but practicable to feed to the cutting and folding machine, to form parts of the complete product, previously printed dry covers, printed in one or more colors, thus absolutely eliminating the offsetting or smutting which would occur if the colored cover was printed at the same time either on the main or supplement press. Furthermore, the assembling of all of the sheets from the press and from the separate sources of web sheet supply, on the stitcher table against the stop 176 insures a perfect sheet register even if the sheets are fed on to the stitcher table quite badly out of register

What I claim is:

1. In a cutting and folding machine, a table, a support for a main web, means for cutting a plurality of sheets therefrom, assembling said sheets and feeding them onto said table, a support for an extra web, means for cutting a sheet therefrom, feeding it onto said table and combining it with the main web sheet thereon.

2. In a cutting and folding machine, a table, means for assembling sheets thereon cut from a previously printed web and means for cutting and feeding extra sheets from a plurality of separate sources of web sheet supply to be combined on the said table with the sheets cut from the previously printed web.

3. In a cutting and folding machine, a table, a support for a main web, means for cutting a plurality of sheets therefrom, assembling the said sheets and feeding them onto said table, supports for a plurality of extra webs and means for cutting sheets from one or more of said extra webs, feeding them onto said table, and combining them with the main web sheets thereon.

4. In a cutting and folding machine, a table, means for assembling a plurality of groups of sheets thereon cut from a previously printed web and means for cutting and feeding an extra sheet from a separate source of web sheet supply to be combined on the said table with the sheets cut from the previously printed web.

5. In a cutting and folding machine, a table, means for assembling a plurality of groups of sheets thereon cut from a previously printed web and means for cutting and feeding an extra sheet from a plurality of separate sources of web sheet supply to be combined on the said table with the sheets cut from the previously printed web.

6. In a cutting and folding machine, a table, means for assembling a plurality of groups of sheets thereon cut from a previously printed web and means for cutting and feeding an extra sheet from one or more of a plurality of separate sources of web sheet supply to be combined on the said table with the sheets cut from the previously printed web.

7. In a cutting and folding machine, a table, means for assembling a plurality of groups of sheets thereon cut from a previously printed web, two separate sources of web sheet supply and a common mechanism for cutting and feeding sheets from the separate sources of web sheet supply to be combined on the said table with the sheets cut from the previously printed web.

8. In a cutting and folding machine, a table, means for assembling a plurality of groups of sheets thereon cut from a previously printed web and means for cutting and feeding two sheets at a time from separate sources of web sheet supply to be combined on the said table with the sheets cut from the previously printed web.

9. In a cutting and folding machine, a table, a support for a main web, means for cutting a sheet therefrom and feeding it onto said table, a support for an extra web and means for cutting a sheet therefrom, feeding it onto said table and combining the main and extra sheets thereon.

10. In a cutting and folding machine, a table, a support for a main web, means for cutting a sheet therefrom and feeding it onto said table, supports for a plurality of extra webs and means for cutting sheets therefrom, feeding them onto said table and combining said main and extra sheets thereon.

11. In a cutting and folding machine, means for cutting sheets from a previously printed web, means for collecting a plurality of the so cut sheets together, means for slitting the sheets into a plurality of groups, means for assembling a plurality of the groups of sheets at a predetermined point and means for cutting and feeding extra sheets from a plurality of separate sources of web sheet supply to said predetermined point to be combined with the assembled groups of sheets.

12. In a cutting and folding machine, means for cutting sheets from a previously printed web, means for collecting a plurality of the so cut sheets together, means for slitting the sheets into a plurality of groups of two sheets each, means for assembling a plurality of the groups of two sheets each at a predetermined point, and means for cutting and feeding extra sheets from a plurality of separate sources of web sheet supply to said predetermined point to be combined with the assembled groups of sheets.

13. In a cutting and folding machine, means for cutting sheets from a previously printed web, a table, means for collecting a plurality of the so cut sheets together, means for slitting the sheets into a plurality of groups, means for assembling a plurality of the groups of sheets on the said table and means for cutting and feeding an extra sheet from a separate source of web sheet supply to said table to be combined with the assembled groups of sheets thereon.

14. In a cutting and folding machine, means for cutting sheets from a previously printed web, a table, means for collecting a plurality of the so cut sheets together, means for slitting the sheets into a plurality of groups, means for assembling a plurality of the groups of sheets on the said table, and means for cutting and feeding extra sheets from a plurality of separate sources of web sheet supply to said table to be combined with the assembled groups of sheets thereon.

15. In a cutting and folding machine, a stitcher table, means for assembling thereon a plurality of groups of sheets cut and fed from a previously printed web with an extra sheet cut and fed from a separate source of web sheet supply, means for stitching the sheets together, a final folding device and means for feeding the sheets thereto from the stitcher table.

16. In a cutting and folding machine, a stitcher table, means for assembling thereon a plurality of groups of sheets cut and fed from a previously printed web with extra sheets cut and fed from separate sources of web sheet supply, means for stitching the sheets together, a final folding device and means for feeding the sheets thereto from the stitcher table.

17. In a cutting and folding machine, a stitcher table, means for assembling thereon a plurality of groups of sheets cut and fed from a previously printed web with an extra sheet cut and fed from a separate source of web sheet supply, a stop for bringing the sheets into register on the stitcher table, means for stitching the sheets together, a final folding device and means for feeding the sheets thereto from the stitcher table.

18. In a cutting and folding machine, a stitcher table, means for assembling thereon a plurality of groups of sheets cut and fed from a previously printed web with extra sheets cut and fed from separate sources of web sheet supply, a stop for bringing the sheets into register on the stitcher table, means for stitching the sheets together, a final folding device and means for feeding the sheets thereto from the stitcher table.

19. In a cutting and folding machine, means for cutting sheets from a previously printed web, a delivery cylinder, a transfer cylinder arranged to transfer a plurality of sheets at a time to the delivery cylinder, slitters coacting with the delivery cylinder for slitting the sheets into a plurality of groups, means for assembling a plurality of the groups of sheets at a predetermined point and means for cutting and feeding an extra sheet from a separate source of web sheet supply to said predetermined point to be combined with the assembled groups of sheets.

20. In a cutting and folding machine, means for cutting sheets from a previously printed web, a delivery cylinder, a transfer cylinder arranged to transfer two sheets at a time to the delivery cylinder, slitters coacting with the delivery cylinder for slitting the sheets into a plurality of groups of two sheets each, means for assembling a plurality of the groups of two sheets each at a predetermined point and means for cutting and feeding an extra sheet from a separate source of web sheet supply to said predetermined point to be combined with the assembled groups of sheets.

21. In a cutting and folding machine, means for cutting sheets from a previously printed web, a table, a delivery cylinder, a transfer cylinder arranged to transfer two sheets at a time to the delivery cylinder, slitters coacting with the delivery cylinder for slitting the sheets into a plurality of groups of two sheets each, means for assembling the groups of sheets on the table and means for cutting and feeding an extra sheet from a separate source of web sheet supply to be combined with the sheets cut from the previously printed web.

22. In a cutting and folding machine, means for cutting sheets from a previously printed web, a delivery cylinder, a transfer cylinder arranged to transfer a plurality of sheets at a time to the delivery cylinder, slitters coacting with the delivery cylinder for slitting the sheets into a plurality of groups, means for assembling a plurality of the groups of sheets at a predetermined point and means for cutting and feeding extra sheets from a plurality of separate sources of web sheet supply to said predetermined point to be combined with the assembled groups of sheets.

23. In a cutting and folding machine, means for cutting sheets from a previously printed web, a delivery cylinder, a transfer cylinder arranged to transfer two sheets at a time to the delivery cylinder, slitters coacting with the delivery cylinder for slitting the sheets into a plurality of groups of two sheets each, means for assembling a plurality of the groups of two sheets each at a predetermined point and means for cutting and feeding extra sheets from a plurality of separate sources of web sheet supply to said predetermined point to be combined with the assembled groups of sheets thereon.

24. In a cutting and folding machine, means for cutting sheets from a previously printed web, a table, a delivery cylinder, a transfer cylinder arranged to transfer two sheets at a time to the delivery cylinder, slitters coacting with the delivery cylinder for slitting the sheets into a plurality of groups of two sheets each, means for assembling the groups of sheets on to the table and means for cutting and feeding extra sheets from a plurality of separate sources of web sheet supply to be combined with the sheets cut from the previously printed web.

25. In a cutting and folding machine. means for cutting sheets from a previously printed web, a sheet receiving table, a delivery cylinder, a transfer cylinder arranged to transfer a plurality of sheets at a time thereto, slitters coacting with the delivery cylinder for slitting the sheets into a plurality of groups, means for feeding the groups of sheets to the sheet receiving table, means for assembling a plurality of the groups of sheets at a predetermined point and means for cutting and feeding an extra sheet from a separate source of web sheet supply to said predetermined point to be combined with the assembled groups of sheets.

26. In a cutting and folding machine, means for cutting sheets from a previously printed web, a sheet receiving table, a delivery cylinder, a transfer cylinder arranged to transfer two sheets at a time thereto, slitters coacting with the delivery cylinder for slitting the sheets into a plurality of groups of two sheets each, means for feeding the groups of sheets to the sheet receiving table, means for assembling a plurality of the groups of sheets at a predetermined point and means for cutting and feeding an extra sheet from a separate source of web sheet supply to said predetermined point to be combined with the assembled groups of sheets.

27. In a cutting and folding machine, means for cutting sheets from a previously printed web, a stitcher table, a sheet receiving table, a delivery cylinder, a transfer cylinder arranged to transfer two sheets at a time thereto, slitters coacting with the delivery cylinder for slitting the sheets into a plurality of groups of two sheets each, means for feeding the groups of sheets to the sheet receiving table, means for assembling the groups of sheets on the stitcher table and means for cutting and feeding an extra sheet from a separate source of web sheet supply on to the stitcher table to be combined with the assembled groups of sheets thereon.

28. In a cutting and folding machine, means for cutting sheets from a previously printed web, a sheet receiving table, a delivery cylinder, a transfer cylinder arranged to transfer a plurality of sheets at a time thereto, slitters coacting with the delivery cylinder for slitting the sheets into a plurality of groups, means for feeding the groups of sheets to the sheet receiving table, means for assembling a plurality of the groups of sheets at a predetermined point and means for cutting extra sheets from a plurality of separate sources of web sheet supply and feeding them to said predetermined point to be combined with the assembled groups of sheets.

29. In a cutting and folding machine, means for cutting sheets from a previously printed web, a sheet receiving table, a delivery cylinder, a transfer cylinder arranged to transfer two sheets at a time thereto, slitters coacting with the delivery cylinder for slitting the sheets into a plurality of groups of two sheets each, means for feeding the groups of sheets to the sheet receiving table, means for assembling a plurality of the groups of sheets at a predetermined point and means for cutting extra sheets from a plurality of extra sources of web sheet supply and feeding them to said predetermined point to be combined with the assembled groups of sheets.

30. In a cutting and folding machine, means for cutting sheets from a previously printed web, a stitcher table, a sheet receiving table, a delivery cylinder, a transfer cylinder arranged to transfer two sheets at a time thereto, slitters coacting with the delivery cylinder for slitting the sheets into a plurality of groups of two sheets each, means for feeding the groups of sheets to the sheet receiving table, means for assembling the groups of sheets on the stitcher table and means for cutting extra sheets from a plurality of separate sources of web sheet supply and feeding them on to the stitcher table to be combined with the assembled groups of sheets thereon.

In testimony, that I claim the foregoing as my invention I have signed my name in presence of two witnesses, this 21st day of June A. D. 1906.

HOWARD M. BARBER.

Witnesses:
A. R. STILLMAN,
G. BURDICK.